United States Patent
Amundson et al.

(10) Patent No.: US 7,100,140 B2
(45) Date of Patent: Aug. 29, 2006

(54) GENERATION OF GRAPHICAL CONGESTION DATA DURING PLACEMENT DRIVEN SYNTHESIS OPTIMIZATION

(75) Inventors: Michael David Amundson, Oronoco, MN (US); Brian Christopher Wilson, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 10/744,172

(22) Filed: Dec. 23, 2003

(65) Prior Publication Data

US 2005/0138590 A1    Jun. 23, 2005

(51) Int. Cl.
*G06F 17/50* (2006.01)
*G06F 9/45* (2006.01)

(52) U.S. Cl. .................... 716/11; 716/4; 716/10
(58) Field of Classification Search .............. None
See application file for complete search history.

(56) References Cited

U.S. PATENT DOCUMENTS

| | | | | |
|---|---|---|---|---|
| 5,311,443 A * | 5/1994 | Crain et al. | ........... | 716/10 |
| 5,796,401 A | 8/1998 | Winer | | |
| 5,798,936 A | 8/1998 | Cheng | | |
| 5,847,965 A * | 12/1998 | Cheng | ........... | 716/9 |
| 5,870,313 A | 2/1999 | Boyle et al. | | |
| 6,009,248 A * | 12/1999 | Sato et al. | ........... | 716/2 |
| 6,068,662 A | 5/2000 | Scepanovic et al. | | |
| 6,070,108 A | 5/2000 | Andreev et al. | | |
| 6,075,933 A | 6/2000 | Pavisic et al. | | |
| 6,099,584 A * | 8/2000 | Arnold et al. | ........... | 716/19 |
| 6,123,736 A | 9/2000 | Pavisic et al. | | |
| 6,192,508 B1 | 2/2001 | Malik et al. | | |
| 6,260,179 B1 * | 7/2001 | Ohsawa et al. | ........... | 716/5 |
| 6,295,627 B1 | 9/2001 | Gowni et al. | | |
| 6,378,114 B1 | 4/2002 | Shenoy et al. | | |
| 6,405,358 B1 * | 6/2002 | Nuber | ........... | 716/12 |
| 6,519,745 B1 | 2/2003 | Srinivas et al. | | |
| 6,618,846 B1 * | 9/2003 | Cheng | ........... | 716/5 |
| 2003/0217338 A1 * | 11/2003 | Holmes et al. | ........... | 716/2 |
| 2005/0138587 A1 * | 6/2005 | Naum | ........... | 716/5 |

FOREIGN PATENT DOCUMENTS

JP    1-273174    11/1989

OTHER PUBLICATIONS

Yehudah Relis et al., "A Customizable Refinable Automatic Floorplanning Tool," IEEE International Conference on Computer Design: VLSI in Computers, Port Chester, New York, 1986.
S. Mayrhofer et al., "Congestion-Driven Placement Using a New Multi-Partitioning Heuristic," IEEE, 1990.

* cited by examiner

*Primary Examiner*—Leigh M. Garbowski
(74) *Attorney, Agent, or Firm*—James R. Nock

(57) ABSTRACT

The present invention provides a method and a computer-readable program for providing generation of graphical congestion images during placement driven synthesis optimization. These graphical congestion images enable a design engineer to make changes and/or improvements to subsequent processes in the design flow before the current placement driven synthesis step completes, thus saving time. This information also provides valuable debug information to PDS developers.

16 Claims, 6 Drawing Sheets

GENERATION OF GRAPHICAL CONGESTION DATA DURING PLACEMENT DRIVEN SYNTHESIS OPTIMIZATION

FIELD OF THE INVENTION

The present invention relates generally to digital logic design systems, and more specifically to the generation of graphical congestion data during placement driven synthesis optimization.

BACKGROUND OF THE INVENTION

Modern semiconductor design relies heavily on the use of various software tools, which perform the tasks required to implement a desired circuit design onto silicon. In general, a traditional serial design process, as shown in FIG. 1 element 100, begins with a definitional design 102 which, as it names implies, describes the desired logical, timing and power parameters of the desired circuit. The definitional design is typically implemented in a computer readable file written in a hardware description language ("HDL") such as Verilog, HDL, VHDL, DSL, etc. The definitional design is also referred to as a behavioral description or model of the circuit. The HDL file is then provided to two categories of tools, which are used to test the design and convert the HDL into other computer readable files needed to actually fabricate the circuit.

The first category includes functional design and verification tools 104 (e.g., simulation tools) which are used to test the circuit's logical performance (i.e., whether the circuit generates the desired output signals in response to a predefined set of input signals). The functional design and verification tools are typically software implemented processes which are run on a workstation or other computer processors. These tools use the HDL file to create a software model of the definitional design. A variety of simulated inputs may then be applied to the software model. The resulting outputs of the model are recorded and compared to expected outputs to determine whether the definitional design produced the logical results required. Since simulation is concerned, primarily, with the logical performance of the design, simulation tools are largely technology independent (i.e., the design has not been mapped to specific cell libraries which contain data for constructing actual electronic components according to known fabrication processes).

The second category includes synthesis and implementation tools. Like simulation tools, synthesis and implementation tools are typically implemented in software which runs on a workstation or other computer processor. However, these tools are highly technology dependent and are used to create an implementation of the circuit components onto the chip. Specifically, logic synthesis tools 106 are used to generate a mapped logic "netlist", which contains a description of the gates and interconnections between gates for the desired circuit. Within traditional logic synthesis tool 106, interconnect delay is modeled using wire-load models (WLM's). Wire load models are statistical predictors of average net behavior which predict wire capacitance, not length or resistance. A designer iterates between synthesis, HDL changes and choice of WLM's (with the aid of a floorplanning tool 108) until synthesis indicates timing closure at the proposed area.

Recently, synthesis tool vendors have added power optimization (i.e., minimization of power consumption), to this logic optimization process. Once the designer achieves closure in synthesis, Design for Testability logic 110 is inserted into the design. This logic includes scan chains, and more powerful DFT extensions such as IEEE 1149.1 structures and Logic Built-in Self Test. The designer defines and inserts clock (and other fanout) powering networks. Next, sign-off tools 112, such as timing analysis, are applied to the design, to assess conformance to criteria for entry into the layout process.

The design then enters the layout process. First, a netlist is provided to a placement tool 114. The placement tool 114 determines where the gates of the circuit will be physically located within a location on the chip which has been predesignated to contain the circuit. This location is referred to as the "image". Physical designers measure timing based on estimated wire delays using methods such as Steiner estimation. The physical designers also resolve timing and congestion problems, using a variety of optimization tools 118 and manual changes, until estimated timing and congestion appear to be good. Sometimes, these problems require logic or floorplan changes by the logic designer, requiring a design handoff between the logic design and the physical designer. Then, further optimization tools are used to re-order the scan chains to minimize wire lengths and latch wire loads. The designer balances the clocks using a clock optimization tool, which re-organizes the connectivity amongst clock buffers and latches with respect to placement, and minimizes buffer loading towards an objective of minimal clock skew at each level of repowering.

After the circuit has been placed, the data from the placement tools is provided to a router 116. The router generates the fabrication data required to construct the metal lines on the chip that connect the components of the circuit together. After routing, parasitics for final timing analysis are extracted. At this point, further engineering changes (ECO's) may be required to fix timing issues such as early mode hold problems, or to alleviate congestion issues. Again, this may require a design hand-off between the physical designer and the logic designer. These final fixes are affected using various optimization tools 118 and manual means. Prior to release of the design to manufacturing, a test engineer produces a set of test vectors for the design, where a final set of manufacturability checks are executed.

After routing and verification, all the files containing the computer data required to fabricate an implementation of the circuit are available. This is referred to as the final design data 120. The final design data is then sent to manufacturing where the final design data from other circuits on the chip are integrated together and the actual chip is manufactured.

In the traditional design flow of FIG. 1, there is significant iteration between design engineering actions (in both the logical and physical design disciplines) and the CPU-intensive tasks of logical & physical design processing and logical and physical optimization.

Recent advances in the area of Placement Driven Synthesis (PDS) have improved this situation. As shown in FIG. 2 element 200, placement driven synthesis techniques can be executed as an early timing closure technique, in which an enhanced logical synthesis tool 202 creates an initial placement that is simultaneously optimized with the logic design. In other words, PDS optimizes a design for timing and area based on input constraints (e.g., timing constraints, die size, technology information, etc.). PDS requires some initial block-level floorplanning, as provided by floorplanner 204. A timing closure feedback loop exists whereby information from logic synthesis 202 is passed back through a timing correction tool 206 and block level floorplanner 204, before being fed back into the logic synthesis tool 202. Since placement information is available within PDS, actual wirelengths, rather than WLM's, are available to aid the designer when optimizing the logic design.

After this early timing closure, the logic designer proceeds to DFT logic and clock logic insertion 110. Placement Driven Synthesis techniques can also be executed as a late timing closure technique by the physical designer. A fully placed design, with an estimated, global, or detailed route, is optimized using a placement-based synthesis tool 208 capable of localized changes to the logic and/or the placement, to fix localized timing or electrical issues. Thus, Placement Driven Synthesis improves the total design process flow by reducing the number of design iterations required between the physical and logical design engineers.

The Placement Driven Synthesis operation is a very complex, multi-step, compute-intensive process which can take several days to complete. Existing design automation tools can be used to graphically view congestion information related to the design before or after PDS optimization. However, executing a post-PDS process step can be time consuming and is meant mostly for interactive debug. In addition, such a step only provides a snapshot of what a design looks like at the end of PDS, and not during the process.

There is a need for a tool to provide graphical congestion data concurrent with a placement driven synthesis operation. Such a tool should provide a graphical, real-time snapshot of what the design looks like during several steps within the placement driven synthesis process. Such information would enable a design engineer to make changes and/or improvements to subsequent processes in the design flow before the current placement driven synthesis step completes, thus saving time. This information would also provide valuable debug information to PDS developers.

SUMMARY OF THE INVENTION

The present invention provides a method and computer-readable program which generates graphical congestion data concurrent with a placement driven synthesis (PDS) operation. The present invention provides a graphical, real-time snapshot of what the design looks like during several steps within the placement driven synthesis process. Such information enables a design engineer to make changes and/or improvements to subsequent processes in the design flow before the current placement driven synthesis step completes, thus saving time. This information also provides valuable debug information to PDS developers.

In one embodiment of the present invention, a method is provided for the generation of graphical congestion images. The method begins by performing a placement driven synthesis of a logical design. The method then generates one or more graphical congestion images concurrent with the performance of the placement driven synthesis. In one embodiment, the method displays the one or more graphical congestion images. In another embodiment, the method analyzes the graphical congestion images, and adjusts a subsequent placement driven synthesis operation as a result of the analysis. The step of analyzing the graphical images includes comparing one or more graphical images from different placement optimization steps to determine how well the placement driven synthesis operation has performed.

The placement driven synthesis operation includes a plurality of steps, wherein the graphical congestion images are generated upon completion of at least one of the plurality of steps within the placement driven synthesis operation. In one embodiment, the graphical congestion images are modified via user entered parameter(s), such as adding a user-specified object to the graphical congestion images. One example of a user-specified object is the addition of timing critical portions of the design to the one or more graphical congestion images. Another example is the addition of alterations from optimization of the design to the one or more graphical congestion images.

The foregoing and other features and advantages of the invention will be apparent from the following more particular description of preferred embodiments of the invention, as illustrated in the accompanying drawings.

DETAILED DESCRIPTION OF THE PREFERRED EMBODIMENTS

The present invention provides an apparatus, method and program product for the generation of multiple graphical congestion data plots concurrent with a placement-driven logic synthesis (PDS) optimization operation. This data enables logic designers to monitor the PDS to determine its real-time status which may allow the designer to make changes/improvements to subsequent processes before the current job completes, thus saving time. These multiple graphical congestion data plots are also a valuable debug aid to PDS developers.

The present invention accesses the same live data used by post-processes to generate graphical images of wire congestion. These graphical images allow the user to access applicable data during PDS without the need of a post-process. As such, the designer is able to monitor the process by viewing the initial congestion images while the process is still running. Graphical congestion images from different optimization steps can be compared to determine how well the PDS process performed and how it may be able to improve wiring congestion.

Figure 1:
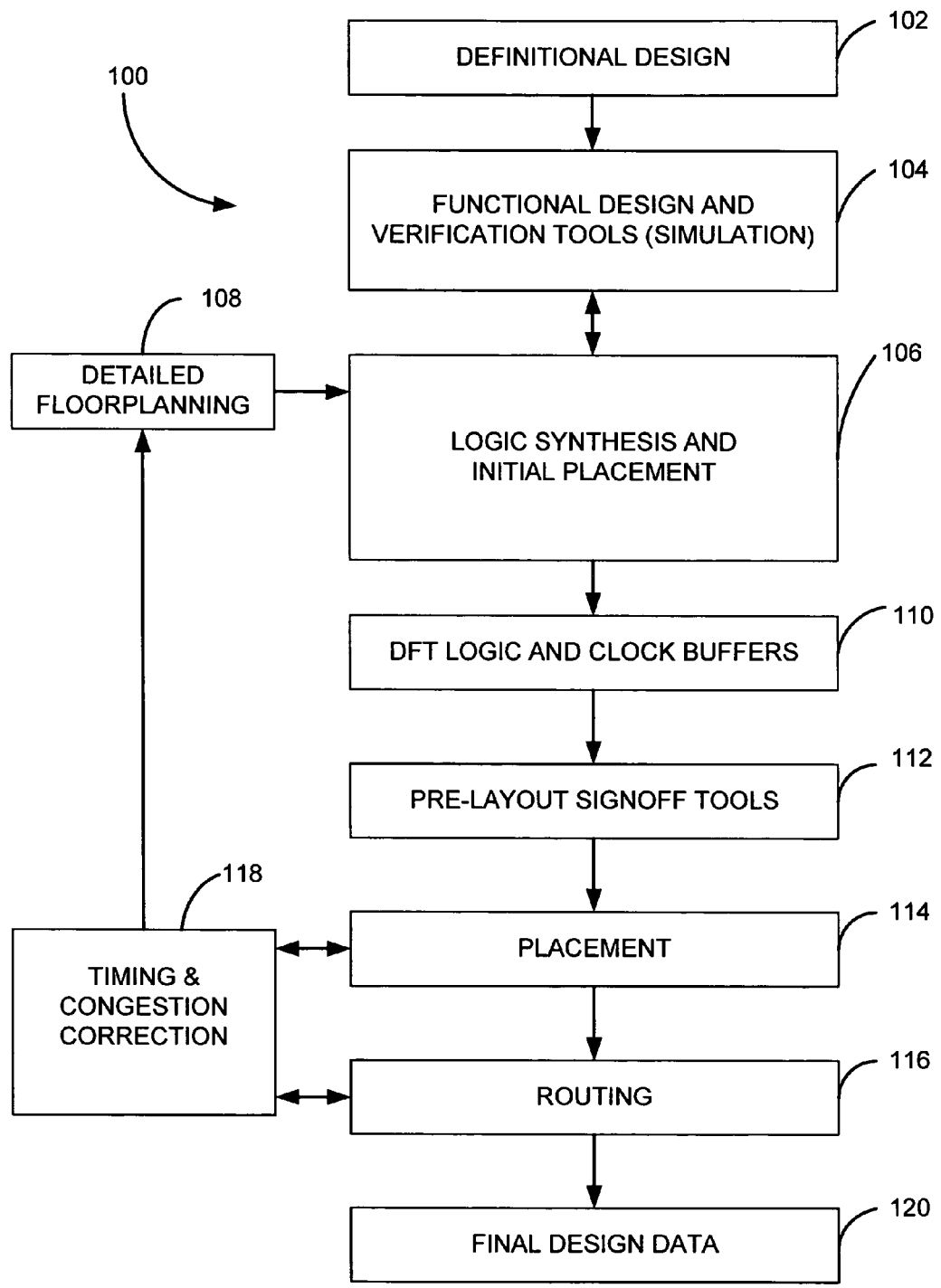
FIG. 1 (Prior Art) is a block diagram illustrating a traditional semiconductor design process.
Figure 2:
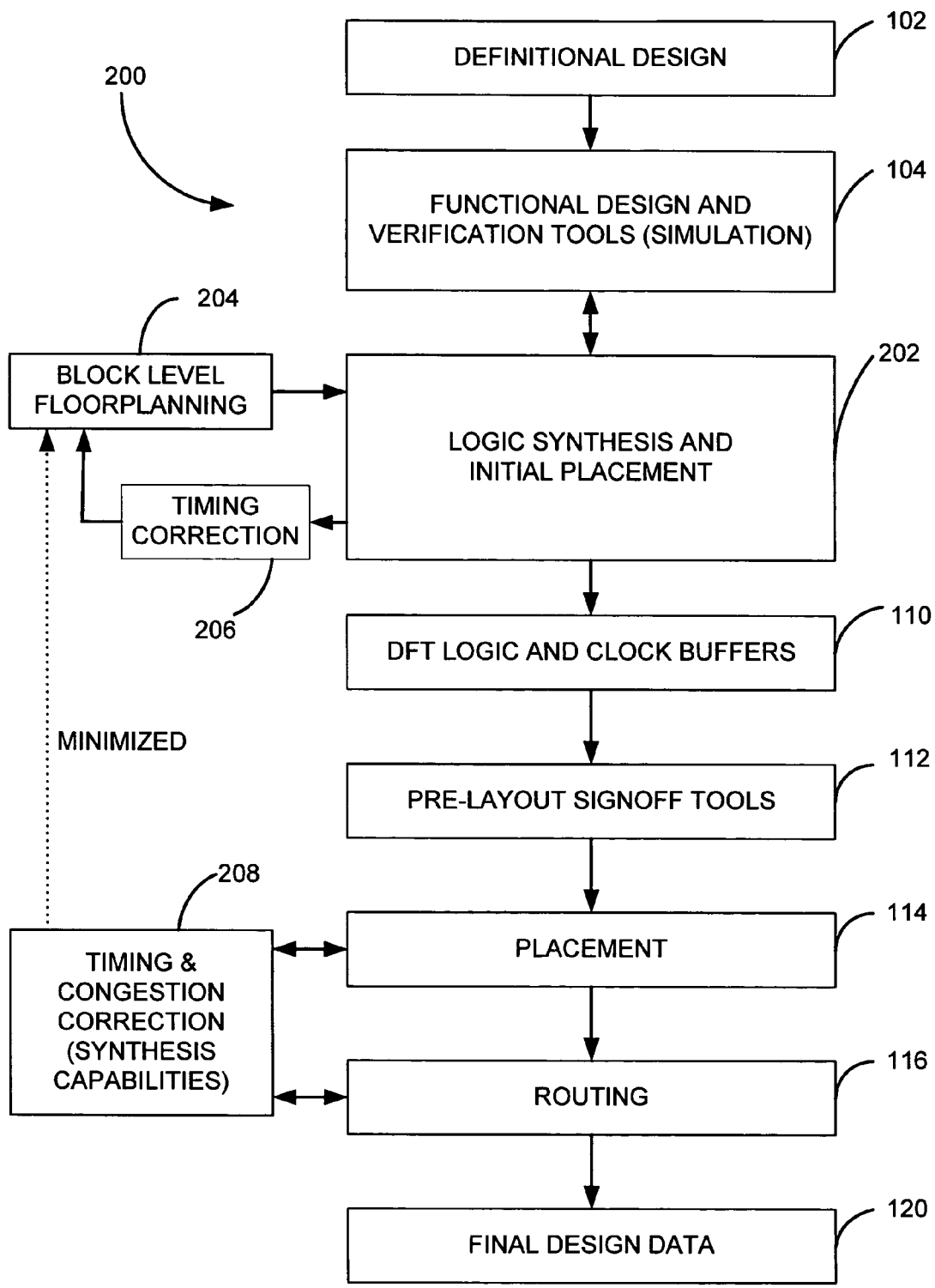
FIG. 2 (Prior Art) is a block diagram illustrating an updated design process incorporating placement driven synthesis (PDS).
Figure 3:
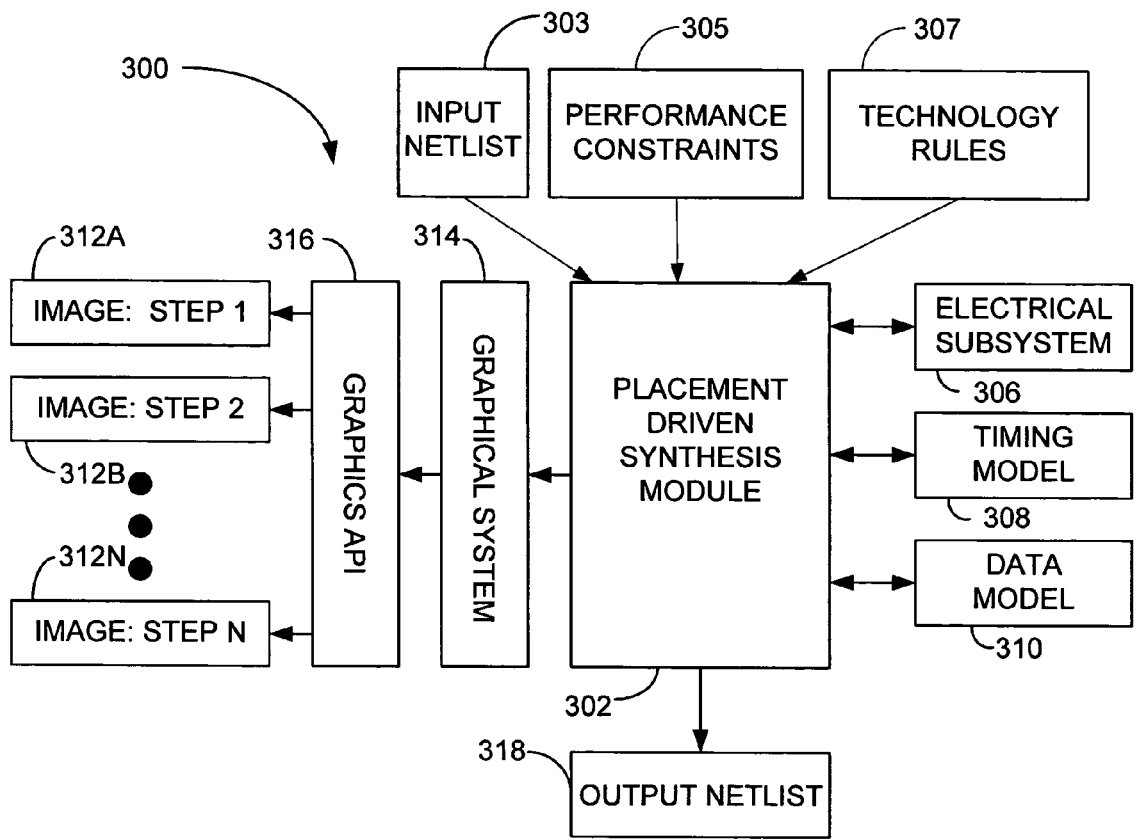
FIG. 3 is a block diagram of how the PDS process interfaces with a graphical system to produce a plurality of wiring congestion images at various stages throughout the placement process in accordance with the present invention.

FIG. 3 is a block diagram of how the PDS interfaces with a graphical system to produce a plurality of wiring congestion images at various stages throughout the placement process, shown generally at 300. A set of input data is provided to a placement driven synthesis module 302. The set of input data includes, but is not limited to, an input netlist 303, performance constraints 305, and technology rules 307. The set of applications which interact with the placement driven synthesis module 302 includes, but is not limited to, an electrical subsystem 306, a timing model 308 and a data model 310. Once the set of input data is provided to placement driven synthesis module 302, a series of steps are sequentially performed by the placement driven synthesis module. These steps are more fully described subsequently in FIG. 5. At the conclusion of each of the key steps within the placement driven synthesis process, a graphical image of congestion data 312A–312N is generated and presented to the design engineer. A graphical system 314 and graphics application program interface module (API) 316 interacts with the placement driven synthesis module 302 in order to produce the graphical images of congestion data 312A–312N. At the conclusion of placement driven synthesis, an output netlist 318 is generated which includes connectivity and placement information.

Figure 4:
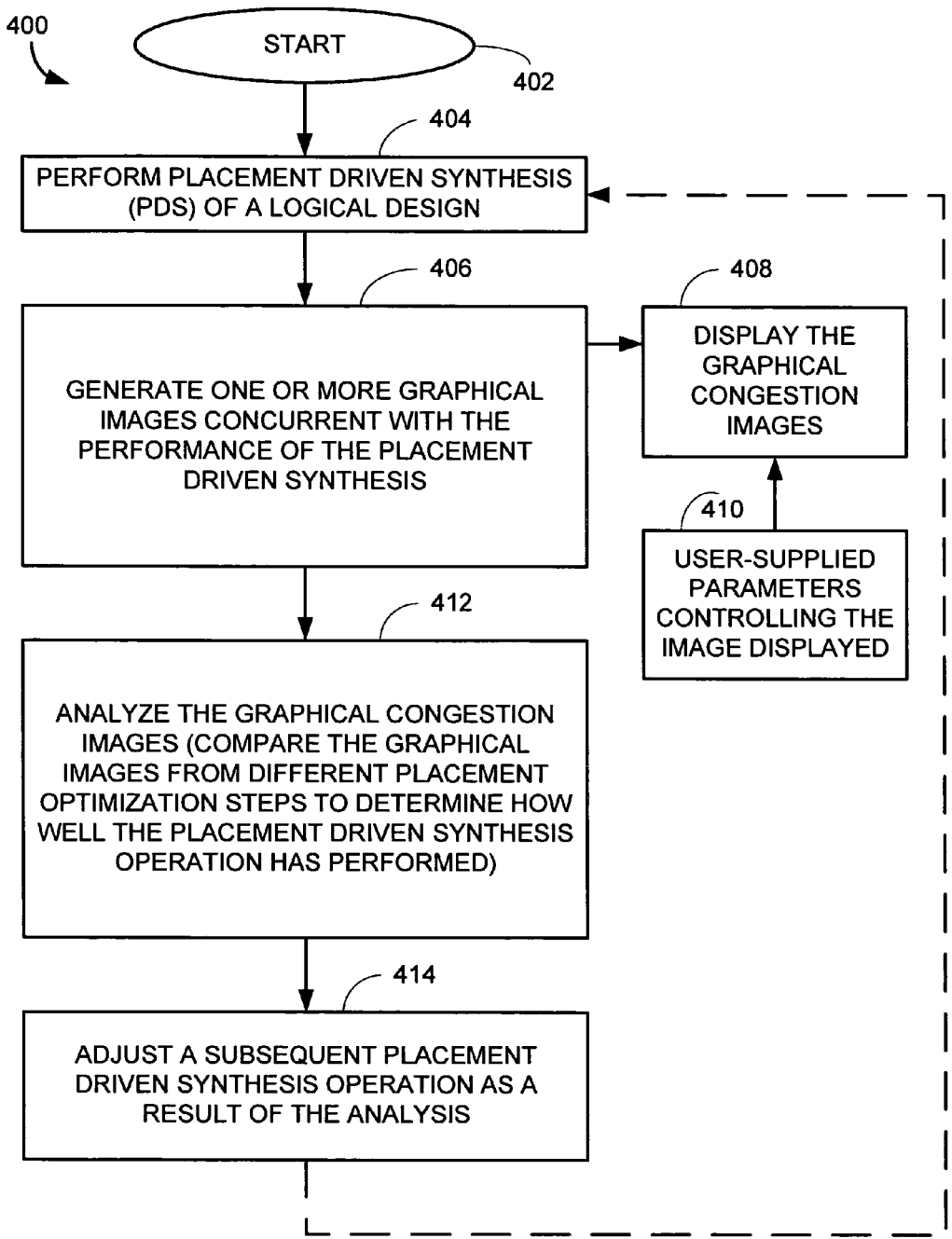
FIG. 4 is a high-level block diagram of a method for generating graphical congestion data during placement driven synthesis optimization, in accordance with the present invention.

FIG. 4 is a high-level block diagram of a method for generating graphical congestion data during placement driven synthesis optimization, shown generally at 400. At block 402, the method begins. At block 404, the method performs placement driven synthesis (PDS) of a logical design. The placement driven synthesis operation comprises a plurality of steps, and can take several hours, if not days, to complete. While block 404 is still executing, block 406 is performed periodically. At block 406, one or more graphical images are generated concurrently with the performance of the placement driven process. In general, block 406 will be called by block 404 at the completion of key intermediate steps within the PDS process (e.g., initial placement, target driven placement, detailed placement, etc.).

At block 408, the graphical congestion images generated at block 406 are displayed for a user. The graphical congestion images displayed for the users may take on several forms. In one embodiment, the chip image of the placed design is broken into a grid of image sub-areas, shown generally in FIG. 6A. Each of the individual sub-areas within the design is displayed with a fill pattern which corresponds to the current level of wiring congestion within the sub-area. Block 408 uses a set of user-supplied parameters supplied by block 410 to control and refine the graphical image being displayed for the user. For example, a user may desire to know when a certain key object appears in a congested sub-area of the design. In another example, the user may be especially interested in timing critical portions of the design. In this case, the user can selectively overlay a set of critical nets over the graphical congestion image, as shown subsequently in FIGS. 6B and 6C. In another example (not illustrated), alterations from optimization of the design can be added to the graphical congestion image.

After one or more graphical congestion images are generated, as previously described in block 406, control also passes to block 412, where the graphical congestion images are analyzed. For example, the graphical images from different placement optimization steps are compared to determine how well the currently executing placement driven synthesis is performing. At block 414, a subsequent placement driven synthesis operation is adjusted as a result of the analysis performed at block 412. In one embodiment, parameters are adjusted within the placement driven synthesis system, and a new PDS process is started. It is also contemplated that parameters within the PDS may be altered such that subsequent steps in the current PDS run may be dynamically adjusted, based on the analysis of the graphical congestion images generated in earlier steps (note the dotted feedback path to element 404).

Figure 5:
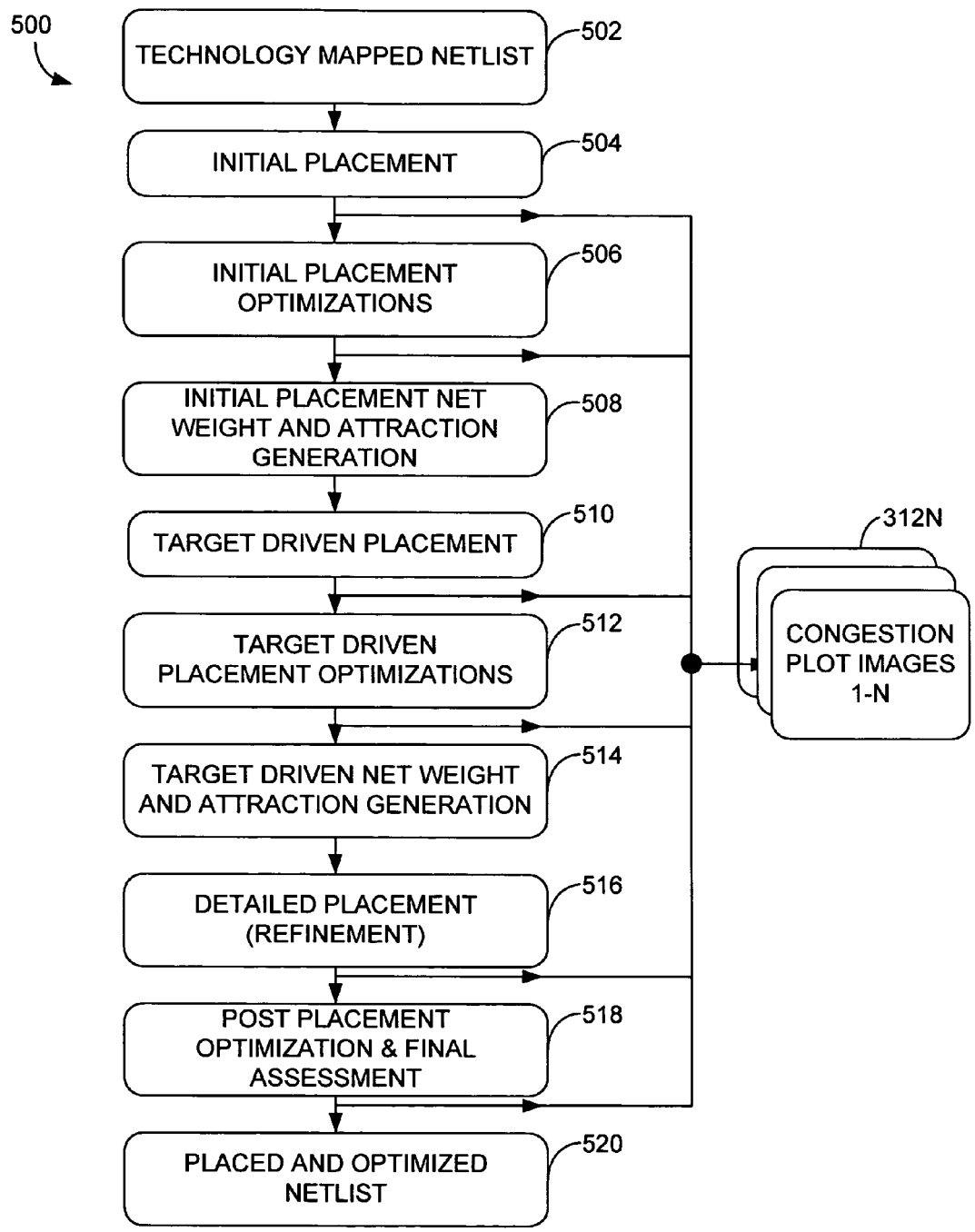
FIG. 5 illustrates a block diagram of the multiple steps of placement optimization performed by PDS, and the generation of graphical congestion images at the conclusion of at least one of the placement optimization steps.

FIG. 5 illustrates a block diagram of the multiple steps of placement optimization performed by PDS, and the generation of graphical congestion images at the conclusion of the placement optimization steps, shown generally at 500. At block 502, a technology mapped netlist (i.e., a netlist containing connectivity information) is provided to the placement driven synthesis tool. At block 504, the placement driven synthesis tool performs its initial placement operation. This placement is generated using minimum wire length. At the conclusion of initial placement, a congestion plot image may be generated, as shown at 312N.

Following initial placement, the placement driven synthesis tool performs a series of initial placement optimizations, as shown at block 506. These optimizations include a relatively course electrical violation correction and timing optimization suite of operations. Additionally, buffers may be inserted and drive strengths changes in efforts to meet timing requirements. At the conclusion of initial placement optimization, a congestion plot image may be generated, as shown at 312N.

After initial placement optimization, the placement driven synthesis tool next performs an initial placement net weight and attraction generation step, as shown at block 508. This step acts as a seed into the target driven placement phase of placement driven synthesis. Next, at block 510, a target driven placement is performed. Target driven placement uses the previous placement as a starting point, and works toward a well-defined performance goal. Target driven placement minimizes wire length by utilizing additional information on the nets that have timing misses. At the conclusion of target driven placement, a congestion plot image may be generated, as shown at 312N.

Upon the completion of target driven placement, the placement driven synthesis tool next performs target driven placement optimizations, as shown at block 512. These optimizations comprise additional electrical violation correction and a timing optimization suite. At the conclusion of target driven placement optimization, a congestion plot image may be generated, as shown at 312N.

Following target driven placement optimization, a target driven net weight and attraction generation step is performed, as shown at block 514. This step is followed by detailed placement, as shown at block 516. Detailed placement performs a fine tuning of the placement generated by the initial and target generation phases, using an algorithmic switch. At the conclusion of detailed placement, a congestion plot image may be generated, as shown at block 312N.

Once detailed placement completes, a post placement optimization and final assessment step is performed, as shown at block 518. This step performs rip-up and rebuild, electrical violation correction and timing optimization at a much finer granularity than previously performed in the initial and target placement steps. At the conclusion of post placement optimization and final assessment, a congestion plot image may be generated, as shown at block 312N. Finally, at block 520, a place and optimized netlist is created.

Figure 6A:
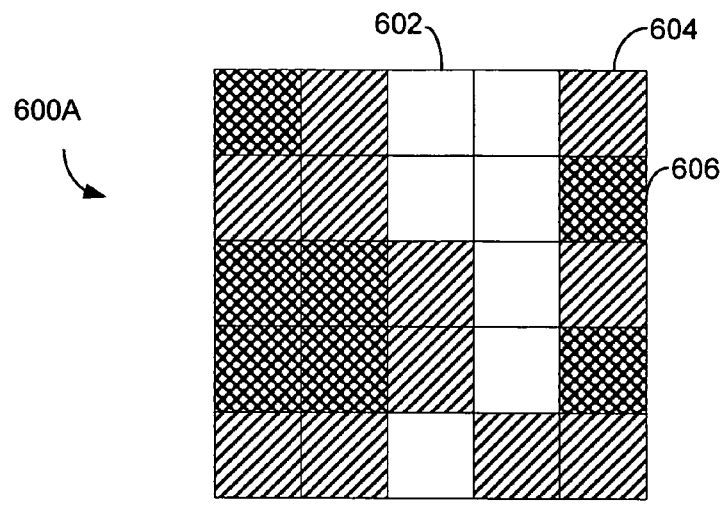
FIG. 6A illustrates an exemplary graphical congestion image plot generated by the present invention during the PDS process, in accordance with the present invention.

FIG. 6A illustrates an exemplary congestion plot generated by the present invention during the PDS process, shown generally at 600A. In the illustrated embodiment, the chip image is divided into twenty-five sub-areas. The number of sub-areas displayed in the congestion plots is a design choice, and fewer or greater number of sub-areas may be used, and still remain within the scope and spirit of the present invention.

Each sub-area is displayed with a fill pattern corresponding to the current level of wiring congestion within that particular sub-area. For example, the non-shaded sub-areas (e.g., element 602), represent sub-areas having minimal wiring congestion. The hatched sub-areas (e.g., element 604) represent sub-areas having a moderate amount of wiring congestion. The cross-hatched sub-areas (e.g., element 606) represent sub-areas having a relatively high level of wiring congestion. The number of levels of wiring congestion and the graphical method used to represent the degree of wiring congestion are for illustrative purposes only. It is contemplated that a fewer or greater number of congestion levels can be chosen and still remain within the scope and spirit of the present invention. Likewise, there are a variety of ways of showing the degree of congestion within a given sub-area (e.g., hatching, colors, actual routing lines, etc.) and still remain within the spirit and scope of the present invention.

By examining two or more congestion plots 600A generated at different stages of the placement driven synthesis process (e.g., after initial placement and after target driven placement), a designer is able to see how well the placement driven synthesis is performing on their current design at incremental stages of the process, and will be able to make changes in future placement driven synthesis operations as a result of information presented in the graphical congestion plots.

Figure 6B:
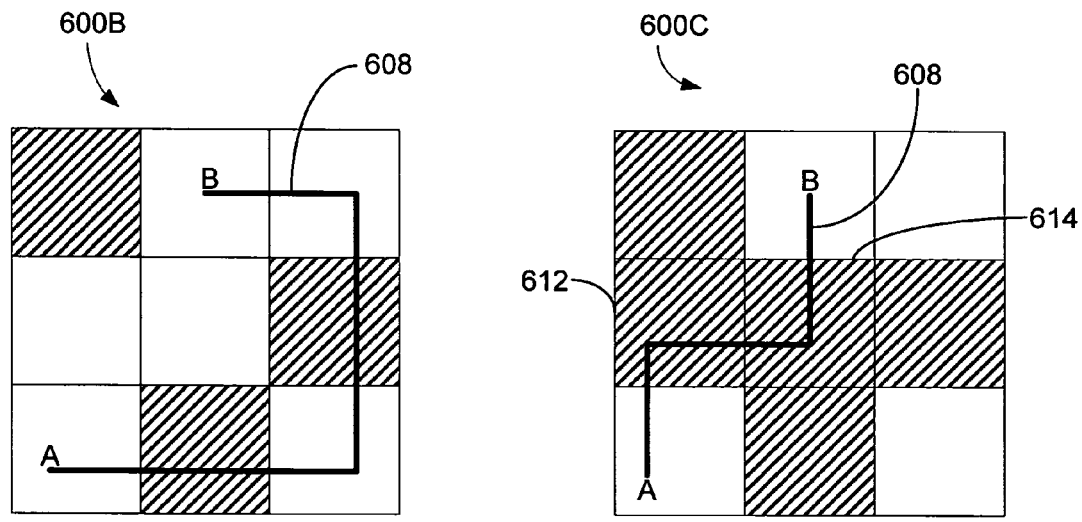
FIG. 6B illustrates a two graphical congestion image plots wherein a critical net is overlayed over the graphical congestion image plots at two different stages of the PDS process, in accordance with the present invention.

FIG. 6B illustrates a two congestion plots wherein a critical net is overlayed over the congestion plots at two different stages of the PDS process, in accordance with the present invention. In the illustrated embodiment, congestion plot 600B represents a congestion plot at an early step of the PDS process (e.g., initial placement), where a timing critical net 608 is overlayed on the congestion plot. Congestion plot 600C represents a congestion plot at a later step of the PDS process (e.g., target driven placement), where the same timing critical net is overlayed on the congestion plot.

As can be seen in the illustrated embodiment, when the routing of critical net 608 is changed to improve timing a wire length, the design becomes more congested, illustrated by the hatched fill patterns indicating higher congestion shown in sub-areas 612 and 614. Thus, a timing-driven transform (such as those used by target driven placement) may do well in reducing timing problems, but at the same time, worsen wiring congestion. This information can prove useful to both designers and tool developers in subsequent efforts to meet all performance limitations of a given design.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer readable signal bearing media used to actually carry out the distribution. Examples of suitable signal bearing media include: recordable type media such as floppy drives and CD RW, and transmission type media such as digital and analog communications links.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A method for the generation of graphical congestion images, the method comprising:
    performing a placement driven synthesis (PDS) of a logical design, wherein the placement driven synthesis comprises a plurality of placement optimization steps; and
    generating one or more graphical congestion images concurrent with the performance of the placement driven synthesis.

2. The method of claim 1, wherein the method further comprises the step of:
    displaying the one or more graphical congestion images.

3. The method of claim 1, wherein the method further comprises the steps of:
    analyzing the one or more graphical congestion images; and
    adjusting a subsequent PDS operation as a result of the analysis.

4. The method of claim 3, wherein the step of analyzing the one or more graphical congestion images further comprises comparing a first graphical congestion image generated during a first placement optimization step against a second graphical congestion image generated during a second, subseauent placement optimization step in order to determine how well the placement driven synthesis has performed.

5. The method of claim 1 wherein the one or more graphical congestion images are generated upon completion of at least one of the plurality of steps within the placement driven synthesis.

6. The method of claim 5, wherein the method further comprises the step of modifying the one or more graphical congestion images via one or more user entered parameters.

7. The method of claim 6, wherein the step of modifying the one or more graphical congestion images via one or more user entered parameters further comprises adding a user-specified object to the one or more graphical congestion images.

8. The method of claim 7, wherein the step of modifying the one or more graphical images via the one or more user entered parameters further comprises adding timing critical portions of the design to the one or more graphical congestion images.

9. A computer-readable program stored on a computer-readable medium, said computer readable program being configured to perform the steps of:
    performing a placement driven synthesis (PDS) of a logical design, wherein the placement driven synthesis comprises a plurality of placement optimization steps; and
    generating one or more graphical congestion images concurrent with the performance of the placement driven synthesis.

10. The computer-readable program of claim 9, wherein the computer-readable program further includes the step of:
    displaying the one or more graphical congestion images.

11. The computer-readable program of claim 9, wherein the computer-readable program further includes the steps of:
    analyzing the one or more graphical congestion images; and
    adjusting a subsequent PDS operation as a result of the analysis.

12. The computer-readable program of claim 11, wherein the step of analyzing the one or more graphical congestion images further comprises comparing a first graphical congestion image generated during a first placement optimization step against a second graphical congestion image generated during a second, subsequent placement optimization step in order to determine how well the placement driven synthesis has performed.

13. The computer-readable program of claim 9, wherein the one or more graphical congestion images are generated upon completion of at least one of the plurality of steps within the placement driven synthesis.

14. The computer-readable program of claim 13, wherein the computer readable program further comprises the step of modifying the one or more graphical congestion images via one or more user entered parameters.

15. The computer-readable program of claim 14, wherein the step of modifying the one or more graphical images via one or more user entered parameters further comprises adding a user-specified object to the one or more graphical congestion images.

16. The computer-readable program of claim 15, wherein the step of modifying the one or more graphical congestion images via the one or more user entered parameters further comprises adding timing critical portions of the design to the one or more graphical congestion images.

* * * * *